United States Patent [19]

Roy

[11] Patent Number: 4,556,864

[45] Date of Patent: Dec. 3, 1985

[54] APPARATUS AND METHOD FOR COMMUNICATING DIGITAL INFORMATION ON AC POWER LINES

[76] Inventor: Joseph J. Roy, 7027 N. 78th Pl., Scottsdale, Ariz. 85258

[21] Appl. No.: 411,686

[22] Filed: Aug. 26, 1982

[51] Int. Cl.[4] ............................................. H04M 11/04
[52] U.S. Cl. ................................ 340/310 A; 329/107; 375/7; 375/36; 375/58; 455/227; 455/307; 340/310 CP
[58] Field of Search ........ 340/310 A, 310 R, 310 CP; 371/62; 375/7, 58, 120, 8, 9, 36, 45, 88; 307/3; 455/227, 229, 307, 36; 329/106, 107, 122

[56] References Cited

U.S. PATENT DOCUMENTS

| | | | |
|---|---|---|---|
| 3,970,944 | 7/1976 | Huellwegen | 375/99 |
| 4,140,999 | 2/1979 | Conway | 340/870.18 |
| 4,142,177 | 2/1979 | Davis | 329/107 |
| 4,385,398 | 5/1983 | Wycoff | 455/227 |
| 4,414,534 | 11/1983 | Whidden | 340/310 A |
| 4,442,500 | 4/1984 | Kongable | 375/96 |
| 4,471,232 | 9/1984 | Peddie | 340/310 A |

Primary Examiner—John W. Caldwell, Sr.
Assistant Examiner—Michael F. Heim
Attorney, Agent, or Firm—Cahill, Sutton & Thomas

[57] ABSTRACT

A carrier current transceiver includes a transmitter section and a receiver section coupled to an AC power line. In the transmit mode, input data in the form of a logical "0" enables a carrier frequency signal to excite a tuned cavity. The tuned circuit includes a first winding of transformer, a capacitor and a damping resistor. A second winding of the transformer is capacitively coupled to the AC power line to produce a stepped down carrier current signal to represent a transmitted logical "0". A logical "1" is represented by absence of the carrier current signal. In the receive mode, a small carrier current signal representing a logical "0" is received via the AC line and is stepped up by the transformer and capacitively coupled to an input of the receiver section. Outband frequencies are removed by means of a second tuned circuit and the resulting signal is amplified by self-biased CMOS inverter circuitry and then is limited by a diode limiter circuit before being input to a phase locked loop data recovery circuit that produces a logical "0" if the carrier frequency is applied for a predetermined period. The damping resistor critically damps large oscillations produced in the first tuned circuit by large noise impulses on the AC line to prevent such oscillations from enduring long enough to be detected as logical "0"s by the phase locked loop data recovery circuit.

23 Claims, 6 Drawing Figures

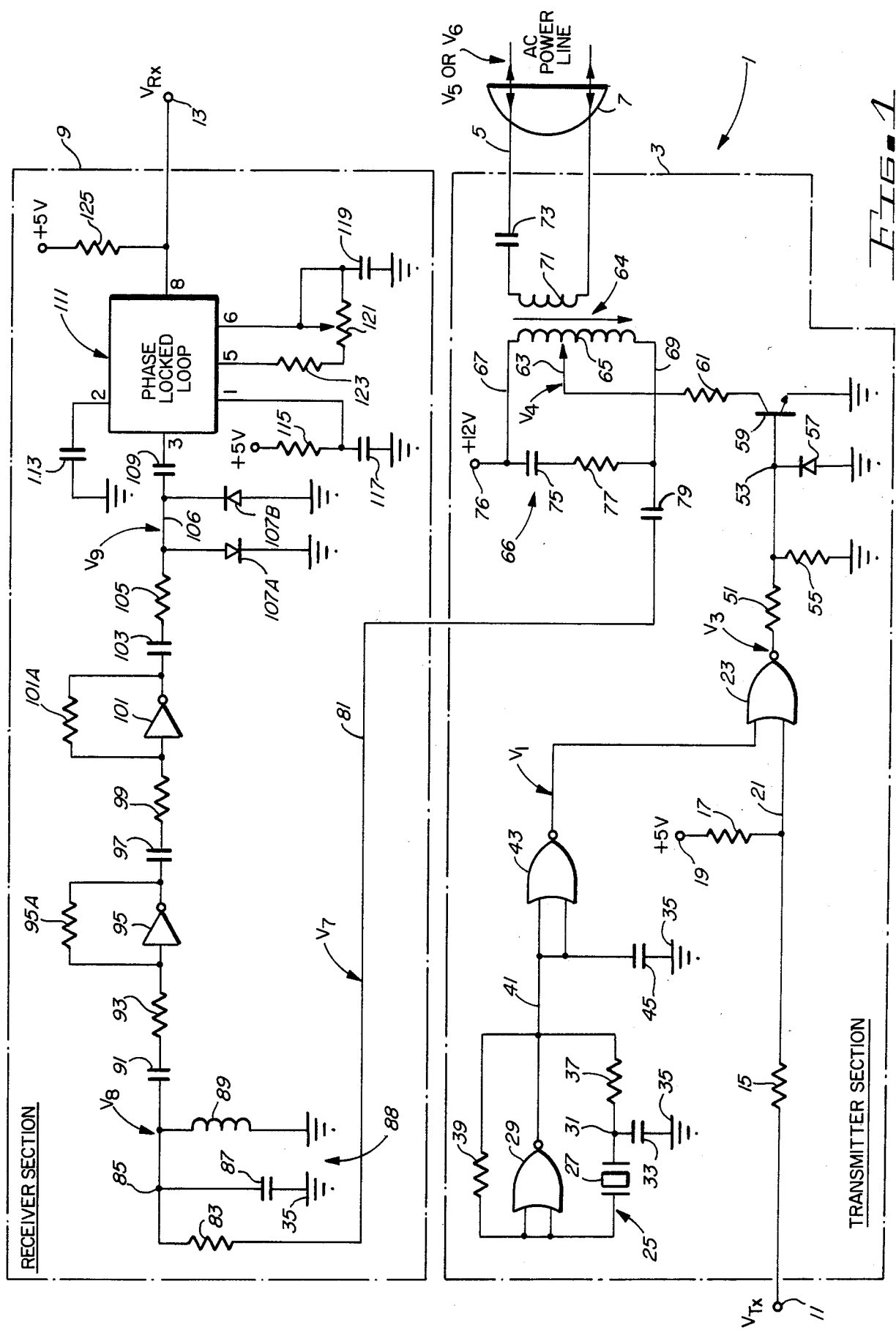

APPARATUS AND METHOD FOR COMMUNICATING DIGITAL INFORMATION ON AC POWER LINES

BACKGROUND OF THE INVENTION

The invention relates to carrier current systems in which digital data is transmitted over AC power lines in the form of modulated "carrier current" signals to accomplish digital communication between two separated locations in an environment in which there is a great deal of spurious noise, especially in the form of large, long duration "impulse noise" signals on the AC line (or any other line in a high noise environment).

The general concept of communicating digital signals from one place to another by superimposing them on an ordinary AC power line is well known. Many specific implementations of this concept have been proposed and/or augmented. Along with the explosive and pervasive growth of using computers to control and/or communicate with various devices in commercial buildings (and even in residences), and in view of the high cost of installing the necessary multi-conductor data buses in buildings to allow such data communication, there has been considerable effort devoted to developing carrier current transceiver (CCT) devices to allow date communications via the ordinary AC power lines in such buildings. Unfortunately, in most commercial establishments, such as restaurants, commerical offices, manufacturing operations, etc., in which there is a need for rapid digital data communication throughout a building, there is an extremely high level of spurious, high magnitude, long duration noise signals on the AC power lines. This noise constitutes a hostile environment which has led to the requirement that CCT systems be implemented with complex, expensive circuitry that prevents the various noise signals from being interpreted as data, or prevents data signals from being drowned out by the noise signals. High noise signal levels and widely varying AC line impedances in a typical AC power line of a typical commercial establishment are caused by a variety of varying loads that are placed on the AC power line. Such loads include the various electrical motors of numerous electrical appliances, light dimmer circuits, filters of television sets, etc. "Impulse noise" pulses having durations in excess of 500 microseconds and having repetition rates that may be substantially in excess of the 60 hertz power line frequency and containing a wide spectrum of frequencies, including frequency components that easily pass through bandpass filters in CCT circuitry are not uncommon on the AC power lines of some commercial establishments. The known CCT circuit techniques sometimes do not attenuate the "noise frequency" components of impulse noise sufficiently to prevent the noise frequency components from being misinterpreted as actual data. Some prior carrier current transceiver devices attempt to transmit digital pulses directly over the AC power line. However, in environments wherein there is a high level of the above-mentioned impulse noise, these digitals pulse techniques have serious shortcomings, since impulse noise is likely to completely dominate some of the digital pulse signals and prevent them from being detected. Unless complex and expensive data recovery techniques are used, this type of data communication will be impaired. Such digital pulse transmission techniques generally require transmission of rather high magnitude pulse signals, which inevitably generate harmonic frequency components, commonly referred to as RFI (radio frequency interference). This RFI frequently interferes with radio and television communications, and is subject to FCC regulation. Furthermore, if numerous digital pulse type carrier current transceivers are to be coupled onto the same AC power lines, complex and expensive encoding and decoding techniques must be utilized to ensure that the different CCT pairs do not interfere with each other. Perhaps to overcome these difficulties, frequency domain techinquies have been utilized to accomplish carrier current communications via AC power lines in commercial establishments, as shown in U.S. Pat. Nos. 3,659,280 and 4,057,793. Other prior art references which are believed to be representative of the state of the art include U.S. Pat. Nos. 3,451,052; 3,460,121; 4,040,046, 4,075,675; 4,270,206; 4,302,844 and 4,308,619. The most sophisticated known prior approach to carrier current transceiver communication is suggested in a paper entitled "A Carrier Current Transceiver IC for Data Transmission Over the AC Lines", which was presented by National Semiconductor Corporation at the 1982 IEEE International Solid State Circuits Conference at Session XII (Data Communications) at Santa Clara, Calif. This paper briefly describes circuitry of a proposed monolithic integrated circuit chip that allegedly functions reliably in communicating "frequency domain" digital data along an AC power line with a high level of electrical noise thereon. The disclosed circuit uses two low frequencies to modulate a carrier to produce on an FSK (frequency shift keyed) data format to represent binary "1"s and binary "0"s. However, the circuit allows impulse noise at either of the shifted carrier frequencies to pass through the filters or tuned circuits and then relies on time domain filters to recover the real data. This proposed circuit is quite complex and would not be reliable at high data rates in circumstances in which the impulse noise is of long duration relative to the highest permissible data rate. The circuitry utilized for generating the FSK signal would have a tendency to be somewhat unstable with respect to temperature or else would probably have to use two crystal oscillators and would be quite expensive. This technique would tend to increase the error rate due to temperature drift.

Other prior art seems to lead to the conclusion that in high noise environments, tone modulation and/or use of automatic level control circuitry are necessary in order to reliably communicate digital data at relatively high data rates on a typical AC power line of a commercial establishment. (Tone modulation is the use of a low frequency signal to modify or modulate a single carrier so that it represents either a "1" or a "0" in contrast to FSK techniques, which use two different carrier signals of different, but usually closely spaced frequencies to represent a "1" and a "0"). This leads to higher complexity and higher costs than is desirable.

Some carrier current communication systems synchronize the carrier current with the 60 Hz frequency of the AC power line in attempting to avoid noise impulses thereon. This approach adds cost and complexity, and is not very effective if cheap light dimmers or other switching devices which do not synchronize their switching with the 60 Hz line frequency are not used, or if multiple phases are used in the AC power system.

Frequently, it is advantageous to encode digital data that is sent over a communications medium. For example, it may be advantageous to encode the data in such a way that clocking information is included with the data. It is desirable that the circuitry in a carrier current communication system be able to properly transmit and receive data that is to encoded.

Accordingly, it is an object of the invention to provide an improved carrier current transceiver system and method which is capable of operating at relatively high data rates in a system wherein the AC power line has large quantities of high magnitude, long duration impulse noise.

It is another object of the invention to provide a carrier current transceiver system and method which is capable of detecting the presence of a carrier current signal in the presence of long duration impulse noise.

It is another object of the invention to provide a low cost, highly reliable, high speed carrier current transceiver system and method for operating in high impulse noise environments.

It is another object of the invention to provide a carrier current transceiver system and method which is highly resistant to damage caused by large magnitude noise signals on the AC power line.

It is another object of the invention to provide an improved, relatively simple, inexpensive, highly stable carrier current transceiver system and method which is highly stable with respect to temperature and which reliably produces a signal representing a digital logic state transmitted over the AC power line in the middle of a bit cell minimum strobe width pulse window of a data recovery circuit.

It is another object of the invention to provide a system which does not require synchronization of the data to the power line frequency and thereby avoids the complexity of this approach and the limiting of the maximum data rate that results.

It is another object of the invention to provice a system which does not limit the format or encoding of data presented to it.

It is another object of the invention to provide an improved carrier current transceiver system and method which substantially increases the number of transceiver units that can be coupled to a particular AC power line without producing so much loading on the AC power line that carrier current signal levels are reduced to an unacceptable level.

SUMMARY OF THE INVENTION

Briefly described and in accordance with one embodiment thereof, the invention provides an improved carrier current transceiver system and method for detecting a carrier signal of a first frequency conducted via an AC power line and representing a first logic state and having a duration that exceeds a predetermined maximum duration expected for any inband impulse noise that is also conducted by the power line, wherein the carrier current transceiver system includes a receiver having a first tuned circuit, which is tuned to the first frequency and is coupled to the AC power line, with a resistive damping element to rapidly dampen in-band noise signals, a second tuned circuit which also is tuned to the first frequency and is of substantially higher Q than the first tuned circuit, and a phase locked loop circuit which produces a signal level representing the first logic state if the carrier signal is present for a longer duration than the predetermined maximum duration of inband impulse noise signal components.

In the described embodiment of the invention, a second logic state is represented by absence of a carrier signal of the first frequency on the AC line. The carrier current transceiver system includes a transmitter section that shares the first tuned circuit with the receiver. The first tuned circuit includes an inductive element which is a primary winding of a transformer and is connected in series with a capacitor and the resistive damping element. A tap point of the primary winding of the transformer is resistively coupled to the collector of a current driver transistor. The base of the transistor is connected to a fast recovery diode and is resistively coupled to the output of a gating circuit. One input of the gating circuit is driven by a crystal oscillator circuit which oscillates at the first frequency. The other input of the gating circuit is coupled to a digital data input. The secondary winding of the transformer is capacitively coupled to the AC power line. The turns ratio between the primary and secondary windings of the transformer is in the range from approximately eight-to-one to twenty-to-one in order to minimize the effect of reflected impedance of the AC power line on the resonant frequency of the first tuned circuit. The first tuned circuit is capacitively and resistively coupled to a second tuned circuit of the receiver. The resonant node of the second tuned circuit is capacitively coupled to a first amplifier stage consisting of a self-biased CMOS inverter. The output of the first amplifier stage is coupled to the input of a second similar amplifier stage. The output of the second amplifier stage is capacitively coupled to a diode limiter and to a capacitor that is connected to the input of a phase locked loop circuit. The phase locked loop circuit is connected and biased to generate the first logic level only if the inband signal propaged through the first and second tuned circuits and the first and second amplifying stages is present for a duration that is at least as long as the predetermined duration, so that inband impulse noise signals are not interpreted as the first logical state. The damping resistor critically dampens oscillations of the first tuned circuit caused by impulse noise components within the pass band of the first tuned circuit after those components have elapsed causing rapid deterioration of such oscillation signals once the inband impulse noise components have elapsed, thereby preventing excessive "ringing" of the first tuned circuit that would in effect, extend the duration of inband noise signals for a time that exceeds the expected maximum duration thereof. Placement of the diode limiter circuit after the second tuned stage prevents any relatively large outband signals that pass through the second tuned stage from causing the limiting circuit to clamp that propagated signal, which would prevent meaningful inband signals of the first frequency from reaching the phase locked loop input and being interpreted as the first logical state. Provision of the critical damping resistor in series connection with the primary inductive winding of the transformer and the capacitor results in rapid attenuation of inband impulse noise components. The turns ratio of the transformer secondary to the primary has a value which is sufficiently high to ensure that the capacitance associated with the power line, when reflected into the tuned circuit by the transformer has a relatively insignificant affect on the resonant frequency of the first tuned circuit.

BRIEF DESCRIPTION OF THE DRAWINGS

FIG. 1 is a schematic circuit diagram of the carrier current transceiver of the present invention.

DESCRIPTION OF THE INVENTION

Figure 1A:
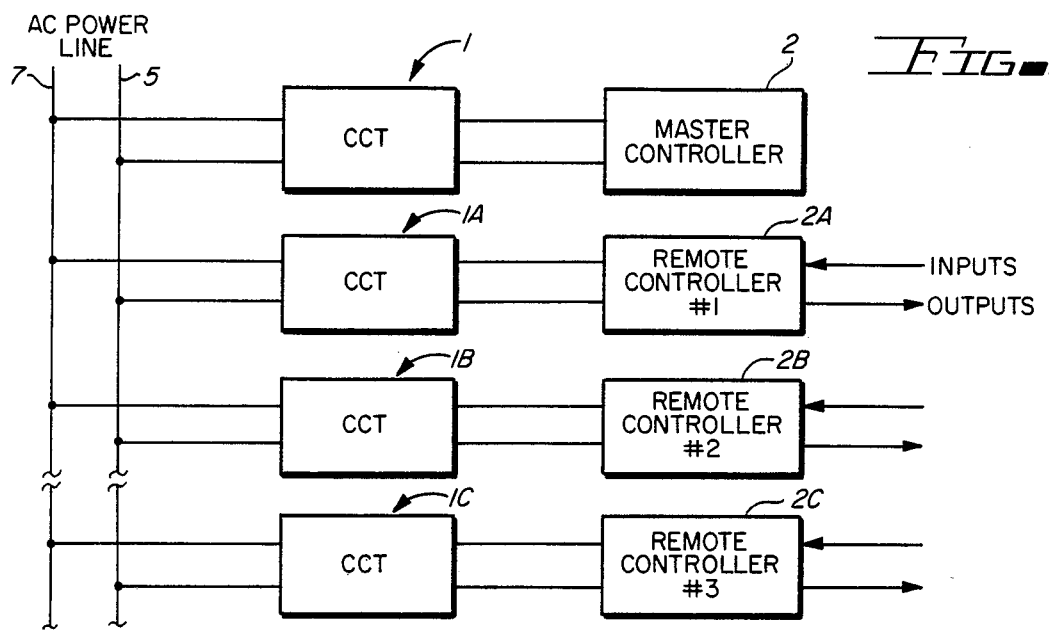
FIG. 1A is a block diagram illustrating connection of a plurality of carrier current transceivers to an AC power line.

Referring now to FIG. 1, carrier current transceiver 1 is coupled directly be means of a coupling capacitor 73 to AC power line conductors 5 and 7. Coupling capacitor 73 provides DC isolation between transceiver 1 and the AC power line 5, 7. AC power line 5, 7 provides ordinary AC power (i.e., 110 volts in the U.S.) to various appliances, lights, and equipment in an establishment in which transceiver 1 is connected. Referring briefly to FIG. 1A, it is seen that transceiver 1 is only one of a number of identical transceivers including 1A, 1B, and 1C that are connected to AC power line 5, 7 in a particular establishment. Current carrier transceiver 1 has its transmit input 11 and its "receive" output 13 connected to a master controller 2, which may be a microprocessor system similar to the one described in commonly owned U.S. Pat. No. 4,222,111 issued Sept. 9, 1980, by Sloan et al., which is incorporated herein by reference. The other transceivers 1A, 1B, and 1C are similarly connected to remote controllers or interface circuits 2A, 2B, and 2C, respectively.

Referring again to FIG. 1, it will be convenient to first describe transmitter section 3 of current carrier transceiver 1. Transmit data conductor 11, to which a logical "1" level or a logical "0" level may be applied, is connected by means of resistor 15 to conductor 21. Conductor 21 is coupled by means of a pull-up resistor 17 to a +5 volt supply conductor 19. Conductor 21 is also connected to one input of a two input CMOS NOR gate 23.

A crystal oscillator circuit 25 includes a crystal 27 having one terminal connected to conductor 31. The other conductor of crystal 27 is connected to both inputs of a two input CMOS NOR gate 29. The two inputs of CMOS NOR gate 29 (which has its inputs shorted so it functions as an inverter) are coupled by means of resistor 39 to conductor 41, which is connected to the output of NOR gate 29. A resistor 37 is connected between conductors 31 and 41. Conductor 41 is connected to both inputs of a CMOS NOR gate 43 (which functions as an inverter) and is also connected by means of capacitor 45 to ground conductor 35. Capacitor 33 is connected between conductor 31 and ground conductor 35. NOR gate 43 produces a voltage V1 and applied V1 to the other input of two input NOR gate 23. The output of NOR gate 23 is coupled by means of resistor 51 to conductor 53. Conductor 53 is connected directly to the base of NPN transistor 59. A resistor 55 is connected between conductor 53 and ground conductor 35. The anode of a diode 57 is connected to ground, and its cathode is connected to conductor 53. NOR gates 29 and 43 are connected as inverters, since there are four of the 4001B CMOS NOR gates, one of which is needed for implementation of NOR gate 23, in a single package, and the other NOR gates therein otherwise would be unused.

The emitter of transistor 59 is connected to ground, and its collector is coupled by means of resistor 61 to conductor 63. Conductor 63 is connected to a tap point of winding 65 of transformer 64. The terminals of winding 65 are connected to conductors 67 and 69, approximately two-thirds of the turns of winding 65 being between tap pont conductor 63 and terminal conductor 69. Conductor 67 is connected to +12 volt supply conductor 76. Conductor 69 is coupled by damping resistor 77 to one terminal of capacitor 75. The other terminal of capacitor 75 is connected to +12 volt conductor 76. Conductor 69 is also coupled by means of capacitor 79 to conductor 81, which is an input of receiver section 9. The inductance of winding 65 and the capacitance of capacitor 75 constitute a tuned circuit that is designated by reference numeral 66. The resistance of resistor 77 is selected to produce critical damping of tuned circuit 66, as will be explained.

A second winding 71 of transformer 64 has one terminal connected to AC power line conductor 7 and a second terminal coupled by means of capacitor 73 to AC power line conductor 5.

Figure 2:
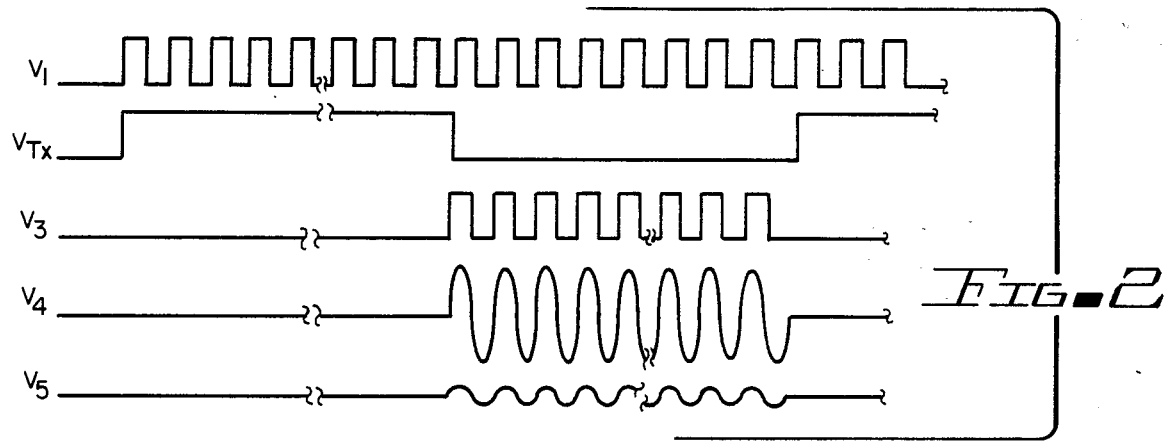
FIG. 2 is a timing diagram useful in explaining the operation of the transmitter section of the carrier current transceiver of FIG. 1.

The voltage produced by the output of NOR gate 23 is designated as V3, the voltage on conductor 63 is designated as V4 and the voltage transmitted by transmitter section 3 between power line conductors 5 and 7 is designated as V5. (Note that a voltage received from power line conductors 5 and 7 is designated V6). These voltages are shown in the timing diagram of FIG. 2.

Oscillator 25 is configured as a Pierce oscillator. Use of a crystal oscillator rather than an LC oscillator provides good temperature stability, which results in being able to use narrower bandwidths in the entire system. This results in higher selectivity being achieved.

Note that NOR gate 43, NOR gate 23, and the input network including conductor 11, resistors 15 and 17, and conductor 21 can be thought of as an amplitude modulator circuit that amplitude modulates the carrier frequency produced on conductor 41 by the crystal oscillator 25 between a full amplitude signal with a stable fixed frequency (in the range from about 50 kilohertz to about 300 kilohertz) and a zero amplitude "signal".

Resistors 15 and 17 function as an input protection network for one input of CMOS NOR gate 23. This protects it against electrostatic discharge that might occur and damage NOR gate 23. Base pulldown resistor 55 discharges the stored base charge in transistor 59. Diode 57 is a fast recovery diode so it can perform the function of protecting transistor 59 and the output of NOR gate 23 against large magnitude AC transients (or the AC power signal itself) that can be coupled back from the AC power line 5, 7 through transformer 64 to the collector of transistor 59. These transients can be several hundred volts in magnitude. This is great enough to cause the outputs of conventional integrated circuit CMOS devices, including NOR gate 23, to "latch up", wherein a four layer diode type of parasitic action (well known to those in the CMOS art) can occur, possibly destroying the CMOS integrated circuit. The reason the diode 57 must be a fast recovery type of diode is that this "latching" action that might destroy NOR gate 23 could possibly occur in as little as one microsecond, and it is necessary that diode 57 recover more quickly than that in order to prevent the latching from occuring, should a really large transient voltage occur between AC power line conductors 5 and 7.

In transmitter operation, transistor 59 goes from a cut-off state to saturation as high and low logic levels of V3 are applied via resistor 51 to the base of transistor 59. It is important to note that it is very undesirable to produce harmonics in the transceiver, because such harmonics might be in the AM broadcast band, causing illegal interference. Resistor 61 allows a sinusoidal signal to be developed in the tuned circuit consisting of winding 65 of transformer 64, capacitor 75 and critical damping resistor 77, thereby greatly reducing the likelihood of generation of such harmonic signals. More specifically, if the collector of transistor 59 were connected directly to the tap point 63, the resonant signal would tend to have a "squared" configuration, rather than being a true sinusoidal waveform. This, of course, would cause undesirable harmonic frequencies (RFI) to be produced on the AC power line 5, 7. At lower frequencies, resistor 61 also tends to limit the current through transistor 59.

Part of the importance of transformer 64 lies in its impedance transformation function. Its primary winding 65 may have an inductance of approximately 400 microhenries. The turns ratio is at least 8 to 1 from the primary winding 65 to secondary winding 71 because the tuned circuit 66 consisting of winding 65 and capacitor 75 will become "detuned" by the shift in reactance caused by the reflected reactance connected between AC power lines 5 and 7 unless the primary-to-secondary turns ratio is high. As long as the reflected reactance is not appreciably high relative to the capacitance of capacitor 75, then its value rather than the value of capacitance of AC power lines 5 and 7 will primarily govern the resonant frequency of the tuned circuit 66. A lower ratio, for example 1 to 1, would result in a substantial detuning of this circuit and increased attenuation of the desired signals having the desired carrier frequency and increased passing of outband signals to receiver section 9. On the other hand, if the primary-to-secondary turns ratio is too high, too little carrier frequency voltage representing a logical "0" will be coupled from transmitter section 3 onto AC power line 5, 7. This will prevent the receiver sections (such as 9 of FIG. 1) of other transceivers (such as 1A, 1B etc. of FIG. 1A) from being able to detect that carrier frequency voltage because of its too small amplitude.

There is a rather optimum ratio between approximately 8 to 1 and 20 to 1 which will cause the capacitive reactance of the AC power line 5, 7 to be approximately 10 times the capacitance reactance of capacitor 75; this is the condition which is desired in order to ensure that the value of capacitor 75 is what primarily controls the resonance frequency of tuned circuit 66. (The reflected impedance "seen" by the tuned circuit 66 is proportional to the square of the turns ratio multiplied by the impedance actually "seen" by secondary winding 71).

The purpose of coupling capacitor 73 is two-fold: First, it provides DC isolation from the AC power line 5, 7. Another purpose is to provide, in conjunction with transformer 64, attenuation of the 60 cycle power frequency normally on AC power line 5,7. The turns ratio of transformer 64 needs to be large enough to reduce the amount of this 60 cycle signal that is coupled back to the collector of transistor 59 and the output of CMOS NOR gate 23 to prevent "latching" thereof.

A low inductance for winding 71 and a high inductance for primary winding 65 are thus desired, and this also dictates the high turns ratio that is mentioned above. The capacitance of coupling capacitor 73 is somewhat critical. If that capacitance is too low, not enough transmitted carrier frequency energy representing a logical "0" will be coupled to the AC power line 5, 7. The smaller the capacitance of capacitor 73, the less energy will be coupled to the AC power line. On the other hand, if capacitor 73 is too large, and there are a lot of similar or identical carrier current transceivers connected to the same AC power line 5, 7, the capacitances of their respective coupling capacitors 73 will add in parallel and may thereby cause excessive capacitive loading on the AC power line. This, of course, will have the effect of diminishing the magnitude of the logical "0" carrrier frequency signal that can be coupled to the power line by transmitter section 3.

With a 12 volt supply voltage connected to the tank circuit at conductor 76, the transmitter circuit typically will couple approximately 4 volta (peak-to-peak) of carrier signal representing a logical "0" onto an unloaded AC power line 5, 7. For heavily capacitively loaded power lines that might be typical of, for example, a large restaurant, the reactive loading of the power line 5, 7 can be so high that a V5 voltage (see FIG. 2) of only approximately 100 millivolts (peak to peak) carrier signal will be coupled onto the AC power line 5, 7 by the circuit as shown in FIG. 1, with the component values indicated in Tables 1 and 2, supra.

The operation of transformer 64 is as follows. If tuned circuit 66 is not externally excited, the voltage on conductor 69 would have a 12 volt peak-to-peak amplitude. However, with tuned circuit 66 excited by the voltage V4 (see FIG. 2) produced in response to transistor 59 when transistor 59 is on, the current through its collector builds up to a relatively large level, causing the current through the upper third of primary winding 65 to reach a rather high level. When transistor 59 is suddenly turned off, the inductance of winding 65 produces a large magnitude voltage on conductor 69, relative to the voltage on conductor 57. More specifically, the peak-to-peak voltage at conductor 69 can reach voltages that are approximately 60 to 70 volts peak-to-peak with respect to conductor 67 when the current in transistor 69 is abruptly turned off.

Figure 3:
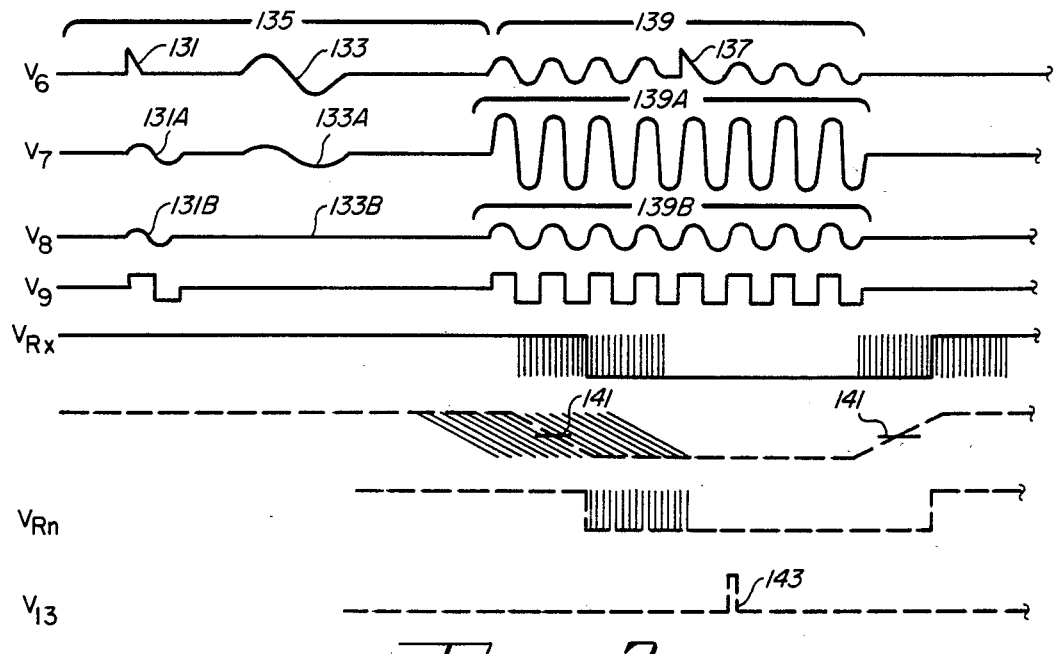
FIG. 3 is a timing diagram useful in explaining the operation of the receiver portion of the carrier current transceiver circuit of FIG. 1.

Next, the receiver section 9 will be described. Note that is a signal is received from one of the other carrier current transceivers such as 1A, 1B, etc. of FIG. 1A via power line 5, 7, the voltage received by transceiver 1 is designated V6 instead of V5. It is assumed that if transceiver 1 is in its receive mode, the value of $V_{TX}$ on conductor 11 is a logical "1". When transceiver 1 is in a receive mode, the voltage on conductor 81 is designated as V7. V6 and V7 are shown in FIG. 3, which shows typical receive mode waveforms.

Still referring to FIG. 1, the circuitry in receiver section 9 includes resistor 83, which couples conductor 81 and voltage V7 to conductor 85. Capacitor 87 is coupled between conductor 85 and ground conductor 35. Inductor 89 is coupled between conductor 85 and ground conductor 35. The voltage on conductor 85 is designated V8.

Capacitor 91 is connected between conductor 85 and one terminal of resistor 93, the other terminal of which is connected to the input of self-biased CMOS inverter 95. The output of CMOS inverter 95 is coupled by means of a feedback resistor 95A to its input to accomplish the self-biasing. The output of inverter 95 is coupled by means of capacitor 97 to one terminal of resistor 99. The other terminal of resistor 99 is connected to the input of self-biased CMOS inverter 101. The output of CMOS inverter 101 is fed back to its input by means of resistor 101A. CMOS inverters 95 and 101 can be implemented by means of a 4069B integrated circuit manufactured by RCA. The output of CMOS inverter 101 also is coupled by capacitor 103 to one terminal of resistor 105, the other terminal of which is connected to conductor 106. The anode of diode 107A is connected to conductor 106, and its cathode is connected to ground conductor 35. The cathode of diode 107B is connected to conductor 106, and its anode is connected to ground conductor 35. The voltage on conductor 106 is designated V9. Conductor 106 is coupled by capacitor 109 to the input of phase locked loop circuit 111. Phase locked loop circuit 111 can be implemented by means of an SE/NE567 phase locked loop integrated circuit manufactured by Signetics Corporation, or equivalent device. If this particular phase locked loop integrated circuit is used, its number 3 lead is connected to capacitor 109. Its number 2 lead it coupled by means of capacitor 113 to ground conductor 35. Its number 1 lead is connected to the junction between resistor 115 and capacitor 117, the other terminal of resistor 115 being connected to +5 volt conductor 19, the other terminal of capacitor 117 being connected to ground conductor 35. The number 5 lead of phase locked loop circuit 111 is coupled by means of a resistor 123 to a variable resistor 121. Lead number 6 of phase locked loop 111 is connected to the tap point of variable resistor 121 and the junction between variable resistor 121 and capacitor 119, the other terminal of which is connected to ground. The output lead of phase locked loop 111 is lead number 8 and is connected to conductor 13. A pull-out resistor 125 couples conductor 113 to the +5 volt supply line.

The values of resistors used in the described embodiment of the invention are given in Table 1. The values of the capacitors used are given in Table 2.

TABLE 1

| Resistor 15 | 10 kΩ |
|---|---|
| Resistor 17 | 100 kΩ |
| Resistor 37 | 470 kΩ |
| Resistor 51 | 100 Ω |
| Resistor 55 | 270 Ω |
| Resistor 61 | 100 kΩ |
| Resistor 77 | 100 kΩ |
| Resistor 83 | 56 kΩ |
| Resistor 93 | 100 kΩ |
| Resistor 95A | 1 kΩ |
| Resistor 99 | 27 kΩ |
| Resistor 101A | 1 kΩ |
| Resistor 105 | 4.7 kΩ |
| Resistor 115 | 15 kΩ |
| Resistor 121 | 0–2 kΩ |
| Resistor 123 | 1 kΩ |
| Resistor 125 | 10 kΩ |

TABLE 2

| Capacitor 33 | 20 pf |
|---|---|
| Capacitor 45 | 150 pf |
| Capacitor 73 | .1 μf |
| Capacitor 75 | .0015 μf |
| Capacitor 79 | 270 pf |
| Capacitor 87 | .0015 μf |
| Capacitor 91 | 220 pf |
| Capacitor 97 | 220 pf |
| Capacitor 103 | .01 μf |
| Capacitor 109 | .002 μf |
| Capacitor 113 | .0047 μf |

TABLE 2-continued

| Capacitor 117 | .1 μf |
|---|---|
| Capacitor 119 | .0047 pf |

Note that the transceiver disclosed in FIG. 1 shares the tuned circuit 66 with both the transmitter and receiver, and therefore is a "half-duplex" system. It could be made into a full duplex system by providing separate transformers such as 64 and a separate associated tank circuits such as 66, tuned to different frequencies for the receiver section 9 and transmitter section 3, respectively. However, for most expected applications of the current carrier transceiver 1, it is expected that full duplex communication will not be needed, and therefore there is no need to add the expense of doubling the number of transformers 64 which would double the resulting loading on the AC line 5, 7. It should be noted that the technique of "sharing" tank circuit 66 between the receiver and transmitter sections eliminates certain technical difficulties associated with having to deal with additional resonance frequencies that would be produced as a result of using two coupling transformers such as 64, since for each such transformer, a secondary resonance frequency is created by the coupling capacitor (such as 73) and secondary winding (such as 71). Such secondary resonance frequencies can cause unpredictable problems.

The following discussion relates to the tuned circuit 66 as it pertains to the receiver section 9. It is emphasized that critical damping resistor 77 is very important to accurate recovery of digital data that is received from the power line 5, 7 in the form of a small amplitude sinusoidal AC voltage signal which often much co-exist with large impulse noise. As previously mentioned, impulse noise on AC power lines is very common, and occurs very frequently, even as often as the 60 hertz power line frequency. If there are several devices, such as electric motors, light dimmers or the like, connected to the same AC power line, the frequency of occurance of impulse noise may be even greater than the 60 hertz power line frequency. The amplitudes of such impulse noise can range all the way from a few volts up to hundreds of volts. Durations of the noise impulses may range from a few microseconds to hundreds of microseconds. For example, many light dimmers, especially the less expensive ones, use Triacs or SCRs to turn off varying amounts of line current at various phases of the 60 hertz line current. This produces varying sizes of current spikes, which in turn, produce a wide range of impulse noise voltages on the power line. The large current spikes often are limited only by the inductance of the AC line, which can produce a very large voltage noise impulses due, for example, to turning on of incandescent lights, which initially draw very large currents as they are turned on.

When a noise impulse or "spike" passes down the AC line and impinges on transformer 64, this noise impulse will have a large range of frequencies inherently contained in it, including some that are equal to the resonant frequency of the tuned circuit 66. Therefore, the noise impulse will cause the tuned circuit 66 to resonate. It will continue to resonate after the noise impulse disappears until the energy stored in the tuned circuit 66 is dissipated. At this point, it should be noted that ordinarily it is desirable that a tank circuit have a high Q, and every effort is made to minimize the amount of resistance in a tank circuit, because such resistance lowers the Q of the tank circuit. However, any tuned circuit that is energized by a high noise environment will continue to oscillate or "ring" unless there is an energy dissipating resistance in the tuned network. If the resonant circuit rings or oscillates for a time period that is anywhere nearly as long as the width of a "bit cell" in a communication system, there is a very high likelihood that the prolonged ringing will be misinterpreted as data by a data recovery circuit, such as the above-mentioned circuitry associated with phase locked loop circuit 11. At a 300 baud rate, a large-amplitude "ringing" of the tank circuit 66 in FIG. 1 for as long as three or four hundred microseconds, caused by a large amplitude inband impulse noise component, could be easily misinterpreted as representing a logical "0". This is because the subsequent filtering (for example, the tank circuit including capacitor 87 and inductor 89 in FIG. 1) will not filter out this ringing because it is tuned to that frequency; this tank circuit is designed to let the inband frequencies pass and filter out only the outband signals.

It should be noted that there is a reason for putting damping resistor 77 in series with capacitor 75, rather than in parallel with it in the tank circuit 66. Putting the impedances of damping resistor 77, capacitor 75, and winding 65 in a series connection rather than a parallel connection results in a higher V7 voltage.

The reason that it was necessary to add the second tuned circuit 88 is that the presence of damping resistor 77 in the first tank circuit 66 greatly lowered its Q, and hence, its selectivity. It therefore was necessary to add the tuned circuit 88 to "get back" this lost selectivity, since a very high degree of selectivity is required in this application to filter out the numerous outband noise signals that can occur in the above-described high noise environment in which transceiver 1 is to be used.

The threshold level of phase locked loop circuit 111 is approximately 100 millivolts. It is necessary to provide amplification to boost up the smallest expected data signals (approximately two or three millivolts) on the power line 5, 7 enough both to make up for the large insertion loss caused by tuned circuits 66 and 88 and to exceed this threshold level in order to ensure that the amplitude of the actual carrier frequency data signals will always be above the 100 millivolt threshold level of phase locked loop 111. The total gain of the two CMOS amplifier stages 95 and 101 is approximately 40. The rest of the required amplification is provided by transformer 64. Capacitive coupling achieved by capacitors 97 and 103 eliminates any "offset" effects. The CMOS inverters have a reasonable amount of gain in the 50 to 300 kilohertz frequency band at which transceiver 1 is likely to be operated. (Note that a typical bipolar integrated circuit low cost operational amplifier does not have good gain characteristics above approximately 100 kilohertz; this fact would necessitate the use of more expensive amplifier devices if a bipolar IC is used).

Referring to the waveforms of FIG. 3, the reference numeral 131 of the V6 waveform represents a noise impulse (of magnitude from a few volts to several hundred volts) on the AC power line 5,7. Reference numeral 133 represents an outband noise signal on the power line 5, 7 and reference numeral 131 represents an impulse noise signal. The effect of tank circuit 66, especially critical damping resistor 77 thereof, is to substantially reduce the amplitude of the ringing of tuned circuit 66 caused by inband components of noise impulse 131 after it has elapsed. This reduction results in the short duration inband signal represented by reference numeral 131A on the V7 waveform in FIG. 3. After this portion of the signal passes through second tuned circuit 88, any outband components of noise impulse 131 have been substantially filtered out, producing the portion of the signal designated by reference numeral 131B of waveform V8 in FIG. 3. The attenuation at the resonance frequencies contained in the noise impulse 131 are attenuated only by the insertion loss of the two resonant circuits 66 and 88. However, the "roll off" characteristic of tuned circuit 66 sharply filters the outband signal 133 to produce the signal designated by reference numeral 133A of the V7 waveform. The much more selective second tuned circuit 88 essentially completely eliminates the outband frequency signal 133, as indicated by reference numeral 133B of the V8 waveform in FIG. 3.

The portion of the V6 waveform in FIG. 3 designated by reference numeral 135 represents a logical "1" being received from AC power line 5, 7 by carrier current transceiver 1. Reference numeral 139 designates a portion of the data signal on the AC power line having the carrier frequency of oscillator 25 and represents a logical "0". Reference numeral 137 represents a noise impulse in the midst of portion 139 of the carrier signal.

When the power supplies for the CMOS inverters 95 and 101 are set at +5 volts, inverter 101 in effect performs a five volt limiting function for large amplitude signals representing a digital "0". However, it is good practice to limit the input applied to phase locked loop circuit 111 to a narrower range than 5 volts. Accordingly, diodes 107A and 107B limit the amplitude of the signals applied to the input of the phase locked loop to plus or minus approximately 0.7 volts. This prevents the phase locked loop circuit 111 from self clipping and detecting certain undesired harmonic signals and the like.

In FIG. 3, reference numeral 139A shows the above sequence of signals representing a logical "0" after they have passed through tank circuit 66, which has attentuated noise impulse 137 and filtered out any outband components of noise impulse 137. Reference numeral 139B shows the waveform V9 after the signals has passed through second tank circuit 88. Waveform V9 shows the resulting signal produced on conductor 106, after it has been clipped by diodes 107A and 107B. This is the signal that is applied to the input of the phase locked looped circuit 111. The duration of the signal portion 139 representing a logical "0" is sufficiently long (for example, 500 microseconds) that phase locked loop circuit 111 recognizes signal 139 as a logical "0", causing the $V_{Rx}$ waveform in FIG. 3, to go from a high level, which represents the logical "1" in this case, to a low level, which represents a logical "0" in this case.

At this point, it is noted that it is important that the tuned circuits 66 and 88 should produce as little insertion loss as possible, so that a minimum amount of amplification by amplifiers 95 and 101 is needed. Such minimum amplification is desirable in order to avoid, as much as possible, the amplification of inband noise signals. For the same reason, it is desirable to have as low an input thereshold as is practical for phase locked loop circuit 111.

It should be noted that it is necessary not to perform the limiting function of diodes 107A and 107B before either of tuned circuits 66 or 88. This is because if a large enough outband noise signal is applied to the limiting diodes before it reaches either tuned circuit, those diodes will be "clamped" by such outband noise signals, and any concurrent inband signal representing a "0"

will not pass beyond the clamped diodes and therefore, will not be detected by the phase locked loop circuit 111. The same reasoning applies, although to a lesser extent, to positioning of the limiting diodes between the second tuned circuit 88 and the amplifier 95. It must be noted that diodes 107A and 107B must be isolated from tuned circuit 88 by a high impedance so that if either diode becomes forward biased due to a large outband signal, the resulting low diode impedance will not have the effect of lowering the Q of that tuned circuit. If this happens, the tuned circuit will also attentuate any inband signal being passed through the tuned circuit. Again, there might be a sufficiently large outband noise signal that passes through both tuned circuits 66 and 88 and succeeds in clamping the diodes, thereby lowering the Q of resonant circuit 88. This results in less attenuation of the outband signal.

It should be noted that the high turns ratio for transformer 64 is important to proper functioning of receiver section 9 because of variations in the load on the AC line reflected by transformer 64 into tuned circuit 66 vary the resonance frequency of tuned circuit 66, causing less of the desired carrier frequency signal energy to be coupled into receiver section 9.

The connection of the phase locked loop circuit 111 is completely standard, as is shown in the data sheet of the Ne/567 tone decoder/phase locked loop integrated circuit as described on pages 451–460 of the Signetics publication entitled "Signetics Analog Data Manual, 1981" incorporated herein by reference.

In the shown configuration, the NE/567 phase locked loop circuit performs the function of producing a low level on conductor 13 whenever a sustained frequency within its detection band is present at its self-biased input which is connected to coupling capacitor 109.

For the particular implementation of the invention described in FIG. 1 in a typical system installed with a number of transceivers on a high noise power line in a large restaurant, data rates of 300–600 bits per second have been very reliably achieved. The upper limit in a low noise environment would be determined mainly by the particular phase locked loop used.

Those skilled in the art will understand that in the kind of system described herein there is a need for "symmetry" in the transmission of the data about a strobe pulse that usually is produced by a data recovery system (not shown) in the circuits (such as the master controller and remote controllers in FIG. 1A) which receive the $V_{Rx}$ voltages produced by the receiver sections 9. The time periods encompassed by reference numerals 135 and 139 in the V6 waveform of FIG. 3 can be thought of as "bit cells". Normally, a data recovery strobe pulse such as 143 in the V13 waveform of FIG. 3 is centered in each bit cell. The higher the data rate, the narrower the bit cells will be, and the more important the above mentioned symmetry becomes. The symmetry of the bit cells will be skewed by temperature-caused drift in the resonant frequencies of the tuned circuit and by temperature-caused variations in the carrier frequency produced by the oscillator 25. Use of the highly stable crystal oscillator of FIG. 1 reduces the symmetry problem referred to above. Since the described system uses only an inexpensive crystal oscillator which is highly stable, the resulting stability in the symmetry of data transmission is achieved at a lower cost than is achievable in any system using FSK techniques, since expensive components of dual crystal controlled oscillators would be required for these. In FIG. 1, variable resistor 121 allows the optimum adjustment of the symmetry of the output of the internal comparator that is coupled to the output of the quadrature detector (not shown) of phase locked loop circuit 11. This results in an adjustment of the symmetry of $V_{Rx}$ about strobe pulse 143. The waveform $V'_{Rx}$ in FIG. 3 represents the "symmetry-adjusted" $V_{Rx}$ waveform. Those skilled in the art will appreciate that as the amount of impulse noise on Ac line 5, 7 increases, the "period of uncertainty" in each bit cell increases. The described system reduces this problem more than any known prior carrier current transceiver system by rapidly damping out ringing of tuned ciruit 66 caused by inband impulse noise frequency components, thereby reducing the amount of time during which an erroneous level might be produced in the $V_{Rx}$ waveform and lessening the symmetry problems.

In contrast, the above-mentioned National Semiconductor system, with its FSK circuitry and closely spaced frequencies representing a "1" and a "0", results in a severe symmetry problem that requires complex, expensive automatic correction techniques. This is because inside the phase locked loop circuit, the two closely spaced frequencies will be converted to two DC voltage levels which are very close to each other in magnitude. A comparator detects whether the voltage being produced in response to the present incoming frequency is one or the other of these two DC levels. Temperature drift of the oscillators producing the two frequencies can result in changes in these two levels. Since they are close together, it is apparently necessary in the National Semiconductor system to adjust the threshold of the comparator to center it between the two DC levels to correct the symmetry problem caused by the temperature drift. If the symmetry problem is not corrected, the error rate will increase.

Figure 4A:
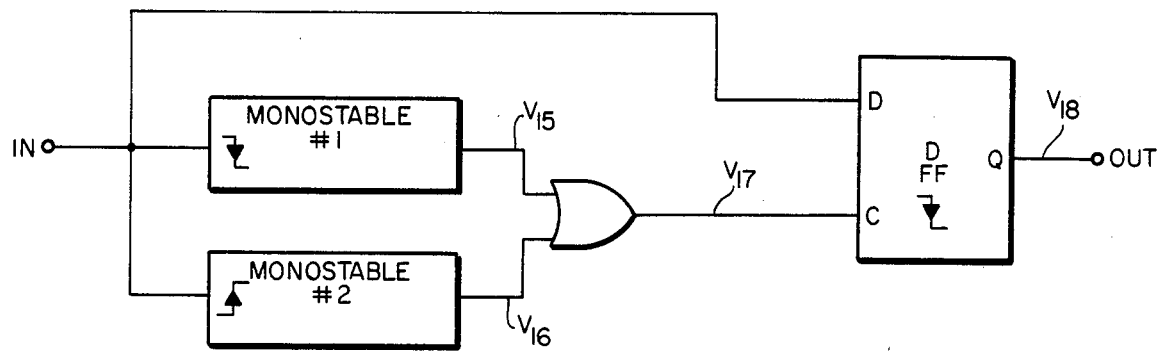
FIG. 4A is a circuit which can be coupled to the output of the receiver section of the carrier current transceiver of FIG. 1 to remove noise glitches from the data stream.
Figure 4B:
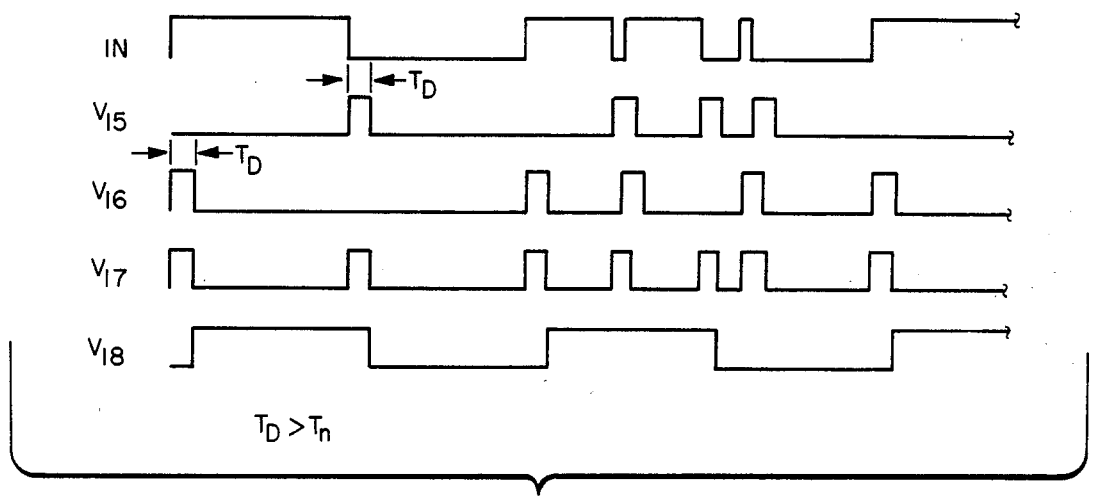
FIG. 4B is a set of waveforms that illustrate the operation of the circuit of FIG. 4A.

In some noisy environments, the noise energy is high enough that the phase locked loop output still contains noise spikes. There is a well known time domain technique which is applicable for lowering the probability of noise glitches in the data cell. The principle of noise deglitch circuit operation is (1) trigger on any input change, (2) delay for a period longer in duration than any anticipated noise spikes, and (3) sample the input. The circuit shown in FIG. 4A is an example implementation of this noise deglitching technique. The waveform of FIG. 4B illustrates typical operation of the circuit of FIG. 4A. The monostables are conventional analog or digital circuits. In the latter case, a counter or shift register is clocked with a frequency, the period of which is at least twice the width of any anticipated noise pulses.

The described CCT system provides a low cost technique for reliably communicating two-way digital data over AC power lines having a high amount of impulse noise thereon. The described system is less complex and less costly, yet more reliable and less subject to impulse noise than any known prior CCT system. Higher data rates can be achieved along a line with might amounts of long duration impulse noise than is the case for any of the prior CCT systems.

While the invention has been described with reference to one embodiment thereof, the claimed invention is intended to encompass various modifications that might be made by others skilled in the art to perform substantially the same function in substantially the same way to achieve substantially the same result.

For example, the described transceiver can be used to accomplish communication over a conductor other than an AC power line that is in a high noise environment. Such a conductor might be one in a signal "trough" containing many other signal conductors. Devices of this type are sometimes referred to as "short haul modems". It is believed that the described device could be effective on such a conductor which is several miles in length in a high noise environment.

I claim:

1. A method for obtaining a logic signal from a first signal conducted by an AC power line to effect digital communication, said first signal including a first signal component having a first frequency for a first duration, said first signal component representing a first digital logic state, said first signal also including an impulse noise component and an outband signal component having a second frequency substantially different than said first frequency, said method comprising the steps of:
    (a) coupling said first signal to an inductive component of a first tuned circuit, said first tuned circuit having a resonant frequency that is substantially equal to said first frequency, said impulse noise component including a relatively large inband noise component having a frequency that is approximately equal to said first frequency, said first signal component and/or said inband noise component causing said first tuned circuit to oscillate at its resonant frequency;
    (b) rapidly damping the oscillations of said first tuned circuit by means of a resistive element in said first tuned circuit immediately after the duration of said first signal component and/or of said inband noise component to rapidly reduce any continuing oscillation of said first tuned circuit immediately after the end of the duration of said inband noise component;
    (c) filtering said first signal by means of a second tuned circuit that is substantially more selective than said first tuned circuit in order to further substantially attenuate any outband components of said first signal, said second tuned circuit having a resonant frequency that is substantially equal to said first frequency, said first signal emerging from said second tuned circuit with said first signal component and/or said inband noise signal therein, any previous outband components of said first signal having been substantially attenuated by said first and second tuned circuits; and
    (d) producing a first logic signal level representing said first logic state if said first signal contains any AC components that have a duration as long as said first duration.

2. The method of claim 1 including the step of limiting the amplitude of said first signal to a predetermined level subsequent to said filtering.

3. The method of claim 2 including the step of producing a second logic signal level representing a second logic state after said filtering if said first signal does not contain any AC components that have a duration as long as said first duration.

4. The method of claim 3 including the step of amplifying said first signal after said filtering step and before said limiting step.

5. The method of claim 4 wherein step (d) includes utilizing a phase locked loop circuit to detect whether said AC components have a duration as long as said first duration and to produce said first and second logic signal levels.

6. The method of claim 5 including initially producing a signal on said AC line substantially similar to said first signal by generating a carrier signal with said first frequency by means of an oscillator, gating said carrier signal by means of a logic gate circuit in response to a first logic signal representing said first logic state, exciting said first tuned circuit in response to said gated carrier signal, and coupling the resonant signal produced by said exciting of said first tuned circuit onto said AC power line.

7. The method of claim 6 wherein said damping critically damps said first tuned circuit.

8. The method of claim 7 wherein said inductive component is a first winding of a coupling transformer having a second winding that is capactively coupled to said AC power line by means of a coupling capacitor.

9. The method of claim 8 wherein said coupling recited in step (a) includes stepping said first signal down by means of said coupling transformer by a factor in the range of approximately 8 to 1 to 20 to 1 in order to substantially eliminate variation in the resonant frequency of said first tuned circuit due to transformer reflected impedance of said AC power line.

10. The method of claim 9 wherein said limiting is performed by means of a pair of diodes.

11. The method of claim 10 including the step of adjusting a transient output filter in said phase locked loop circuit to produce an output logical level that is substantially symmetrical with respect to a predetermined strobe time from said phase locked loop circuit.

12. The method of claim 1 including interpreting an absence of an AC signal component of said first signal having said first frequency and enduring for at least as long as said first duration as a second logic state.

13. A carrier current transceiver system comprising in combination:
    (a) a transmitter;
    (b) a receiver, said receiver including
        (i) a first tuned circuit which has a first frequency as its resonant frequency;
        (ii) means responsive to a first signal, which is conducted by an AC power conductor and includes an Ac signal component that has a frequency equal to said first frequency, for coupling said first tuned circuit to said AC power conductor and causing said first tuned circuit to oscillate at said first frequency in response to said AC signal component, said first signal also sometimes including impulse noise containing an inband impulse noise component having said first frequency, said inband impulse noise component also causing said first tuned circuit to oscillate at said first frequency;
        (iii) resistive damping means in said first tuned circuit for immediately and rapidly damping oscillations that continue in said first tuned circuit after the end of the duration of said inband impulse noise component, thereby preventing continued oscillation of said first tuned circuit from effectively extending the duration of said inband impulse noise component of said first signal as said first signal passes through said first tuned circuit;
        (iv) a second tuned circuit which has a resonant frequency equal to said first frequency and has a substantially narrower pass band and a substantially higher Q than said first tuned circuit, said second tuned circuit receiving said first signal and substantially further attenuating any outband components that may be in said first signal; and (v) means responsive to said second tuned circuit for detecting said AC signal component in said first signal after said first signal has passed through said second tuned circuit, said detecting means producing a logic level representing a first logic state if said AC signal component has a duration that exceeds a predetermined maximum expected duration of any inband impulse noise component likely to be conducted by said AC power conductor.

14. The carrier current transceiver system of claim 13 wherein said detecting means interprets the absence of an AC signal component that lasts longer than said predetermined maximum expected duration of any inband impulse noise component as a second logical state and then produces a second logic level representing said second logic state.

15. The carrier current transceiver of claim 14 wherein said transmitter includes a crystal controlled oscillator that produces a carrier signal having said first frequency, an input conductor for conducting first and second logic level signals representing said first and second logic states, respectively, gating circuit means responsive to said input conductor and said carrier signal of said oscillator for producing an information signal that includes (1) a carrier signal component of said first frequency to represent said first logical state when said first logic level signal is applied to said input conductor, and (2) a DC component to represent said second logical state when said second logical level signal is applied to said input conductor.

16. The carrier current transceiver of claim 15 including a transformer for AC coupling said first tuned circuit to said AC power line, the primary winding of said transformer being included in said first tuned circuit and having a substantially greater number of turns than the secondary winding of said transformer.

17. The carrier current transceiver of claim 15 wherein said transmitter includes a transistor responsive to said information signal, said primary winding including a tap point that is resistively coupled to the collector of said transistor to excite said first tuned circuit to cause therein large amplitude oscillations at said first frequency, which oscillations are stepped down and coupled by said secondary winding to said AC power conductor.

18. The carrier current transceiver of claim 17 wherein said first tuned circuit and said transformer are shared in a half-duplex manner by said transmitter and said receiver.

19. The carrier current transceiver of claim 18 including an amplifier stage responsive to said second tuned circuit, said amplifier stage including a self-biased CMOS inverter.

20. The carrier current transceiver of claim 19 including a diode limiter circuit coupled between said amplifier stage and an input of said detecting means to limit the amplitude of AC variations of said first signal applied to an input of said detecting means.

21. The carrier current transceiver of claim 20 wherein said detecting means includes a phase locked loop circuit.

22. The carrier current transceiver of claim 21 wherein the ratio of the turns ratio of said primary winding to said secondary winding has a value between approximately 8 and 20, said value reducing reflected impedance of said AC line enough to have negligible influence on the resonant frequency of said first tuned circuit while also permitting an adequate AC signal component representing said first logical state to be coupled from said transmitter to said AC line.

23. A method for obtaining a logic signal from a first signal conducted by a conductor to effect digital communication, said first signal including a first signal component having a first frequency for a first duration, said first signal component representing a first digital logic state, a noise signal having an inband component and an outband component being superimposed on said conductor, first signal also including an impulse noise component, said outband signal component having a second frequency substantially different than said first frequency, said method comprising the steps of:

(a) coupling said first signal to a first tuned circuit, said first tuned circuit having a resonant frequency that is substantially equal to said first frequency, said large inband noise component being relatively large and having a frequency that is approximately equal to said first frequency, said first signal component and/or said inband noise component causing said first tuned circuit to oscillate at its resonant frequency;

(b) rapidly damping the oscillations of said first tuned circuit by means of a resistive element in said first tuned circuit immediately after the duration of said first signal component and/or said inband component to rapidly reduce any continuing oscillation of said first tuned circuit immediately after the end of the duration of said inband noise component;

(c) producing a first logic signal level representing said first logic state if said first signal contains any AC components that have a duration as long as said first duration; and (d) filtering said first signal by means of a second tuned circuit that is substantially more selective than said first tuned circuit in order to further substantially attenuate said outband component and/or andy outband components of said first signal before step (c), said second tuned circuit having a resonant frequency that is substantially equal to said first frequency, said first signal emerging from said second tuned circuit with essentially only said first signal component and/or said inband noise signal therein.

* * * * *